(12) United States Patent
Murata et al.

(10) Patent No.: US 11,249,493 B2
(45) Date of Patent: Feb. 15, 2022

(54) FLIGHT SUPPORT SYSTEM OF AIRCRAFT, METHOD OF SUPPORTING FLIGHT OF AIRCRAFT, FLIGHT SUPPORT MEDIUM OF AIRCRAFT, AND AIRCRAFT

(71) Applicant: SUBARU CORPORATION, Tokyo (JP)

(72) Inventors: Iwao Murata, Tokyo (JP); Kumiko Kindaichi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 127 days.

(21) Appl. No.: 16/718,445

(22) Filed: Dec. 18, 2019

(65) Prior Publication Data

US 2020/0249701 A1 Aug. 6, 2020

(30) Foreign Application Priority Data

Jan. 29, 2019 (JP) .............................. JP2019-012643

(51) Int. Cl.
*G05D 1/10* (2006.01)
*G01F 23/00* (2006.01)
*G08G 5/00* (2006.01)

(52) U.S. Cl.
CPC ....... *G05D 1/1062* (2019.05); *G01F 23/0069* (2013.01); *G08G 5/0034* (2013.01)

(58) Field of Classification Search
CPC .............. G05D 1/1062; G01F 23/0069; G08G 5/0034; G08G 5/045; G08G 5/0082; G08G 5/0013; H04W 4/44
See application file for complete search history.

(56) References Cited

U.S. PATENT DOCUMENTS

| 10,037,706 B1 * | 7/2018 | Cutler .................. G05D 1/104 |
| 2016/0117929 A1 * | 4/2016 | Chan .................... G06Q 30/04 |
| | | 701/3 |
| 2016/0327946 A1 | 11/2016 | Koga et al. |
| 2016/0353358 A1 | 12/2016 | DeBusk et al. |
| 2016/0371985 A1 | 12/2016 | Kotecha |

(Continued)

FOREIGN PATENT DOCUMENTS

| JP | 2016-211973 A | 12/2016 |
| JP | 2017-076302 A | 4/2017 |
| JP | 2017-126101 A | 7/2017 |

OTHER PUBLICATIONS

Extended European Search Report issued in corresponding European Patent Application No. 19 21 7949 dated Jun. 15, 2020.

(Continued)

*Primary Examiner* — Thomas G Black
*Assistant Examiner* — Ana D Thomas
(74) *Attorney, Agent, or Firm* — Troutman Pepper Hamilton Sanders LLP

(57) ABSTRACT

According to one implementation, a flight support system of an aircraft includes storage and an information processing device. The storage stores position information on at least one river above which a space is an option for a flight path of the at least one aircraft. The information processing device automatically determines at least whether the flight path of the at least one aircraft should be over a specific river included in the at least one river in order to fly the at least one aircraft to a destination, based on the position information stored in the storage.

23 Claims, 2 Drawing Sheets

(56) References Cited

U.S. PATENT DOCUMENTS

2017/0200376 A1 7/2017 Itabashi et al.
2018/0305012 A1 10/2018 Ichihara
2020/0232794 A1* 7/2020 Yanagishita ........... G01C 9/005

OTHER PUBLICATIONS

Barbatei, R., et al. "Acqyisition and Relaying of Data from a Floating Wireless Sensor Node using an Unmanned Aerial Vehicle" 2015 International Conference on Unmanned Aircraft Systems (ICUAS), pp. 677-586 (2015).

* cited by examiner

FLIGHT SUPPORT SYSTEM OF AIRCRAFT, METHOD OF SUPPORTING FLIGHT OF AIRCRAFT, FLIGHT SUPPORT MEDIUM OF AIRCRAFT, AND AIRCRAFT

CROSS REFERENCES TO RELATED APPLICATIONS

This application is based upon and claims the benefit of priority from Japanese Patent Application No. 2019-12643, filed on Jan. 29, 2019; the entire contents of which are incorporated herein by reference.

FIELD

Implementations described herein relate generally to a flight support system of an aircraft, a method of supporting a flight of an aircraft, a medium storing a flight support program of an aircraft, and an aircraft.

BACKGROUND

When an aircraft is flown, it is necessary to determine a destination and a flight path corresponding to the destination. For that reason, various systems for supporting setup of a destination and a flight path of an aircraft have been proposed (for example, refer to Japanese Patent Application Publication JP2016-211973, Japanese Patent Application Publication JP2017-076302, and Japanese Patent Application Publication JP2017-126101).

An object of the present invention is to make it possible for an aircraft to fly along a more desirable flight path.

SUMMARY OF THE INVENTION

In general, according to one implementation, a flight support system of at least one aircraft includes storage and an information processing device. The storage stores position information on at least one river above which a space is an option for a flight path of the at least one aircraft. The information processing device automatically determines at least whether the flight path of the at least one aircraft should be over a specific river included in the at least one river in order to fly the at least one aircraft to a destination, based on the position information stored in the storage.

Further, according to one implementation, a flight support system of at least one aircraft is built in a water level gauge which measures a water level of a river and transmits the measured water level and a measuring point of the water level with a first wireless device. The flight support system has an information processing device and storage. The information processing device acquires position information on the at least one flying aircraft at a predetermined time, through the first wireless device of the water level gauge. The position information is transmitted, as a first wireless signal, from a second wireless device in the at least one aircraft. The storage stores the acquired position information. The information processing device is adapted to transmit the position information stored in the storage, as a second wireless signal, through the first wireless device of the water level gauge so as to allow receiving with a third wireless device with which another aircraft or a control system for controlling the at least one aircraft from an outside of the at least one aircraft is equipped.

Further, according to one implementation, a method of supporting a flight of at least one aircraft includes: determining at least one river above which a space may be an option for a periodic flight path of the at least one aircraft, and storing position information, on the determined at least one river, in storage; and determining a flight path of the at least one aircraft to a flight path over a river included in the at least one river, based on the position information on the at least one river stored in the storage when the flight path over the river can be selected, based on a predetermined selection condition, in order to fly the at least one aircraft to a destination.

Further, according to one implementation, a medium stores a flight support program of at least one aircraft. The flight support program causes a computer to function as storage and an information processing device. The storage stores position information on at least one river above which a space is an option for a flight path of the at least one aircraft. The information processing device automatically determines at least whether the flight path of the at least one aircraft should be over a specific river included in the at least one river in order to fly the at least one aircraft to a destination, based on the position information stored in the storage.

Further, according to one implementation, an aircraft has the above-mentioned flight support system.

DETAILED DESCRIPTION

A flight support system of an aircraft, a method of supporting a flight of an aircraft, a medium storing a flight support program of an aircraft, and an aircraft according to implementations of the present invention will be described with reference to the accompanying drawings.

(Configuration and Function)

Figure 1:
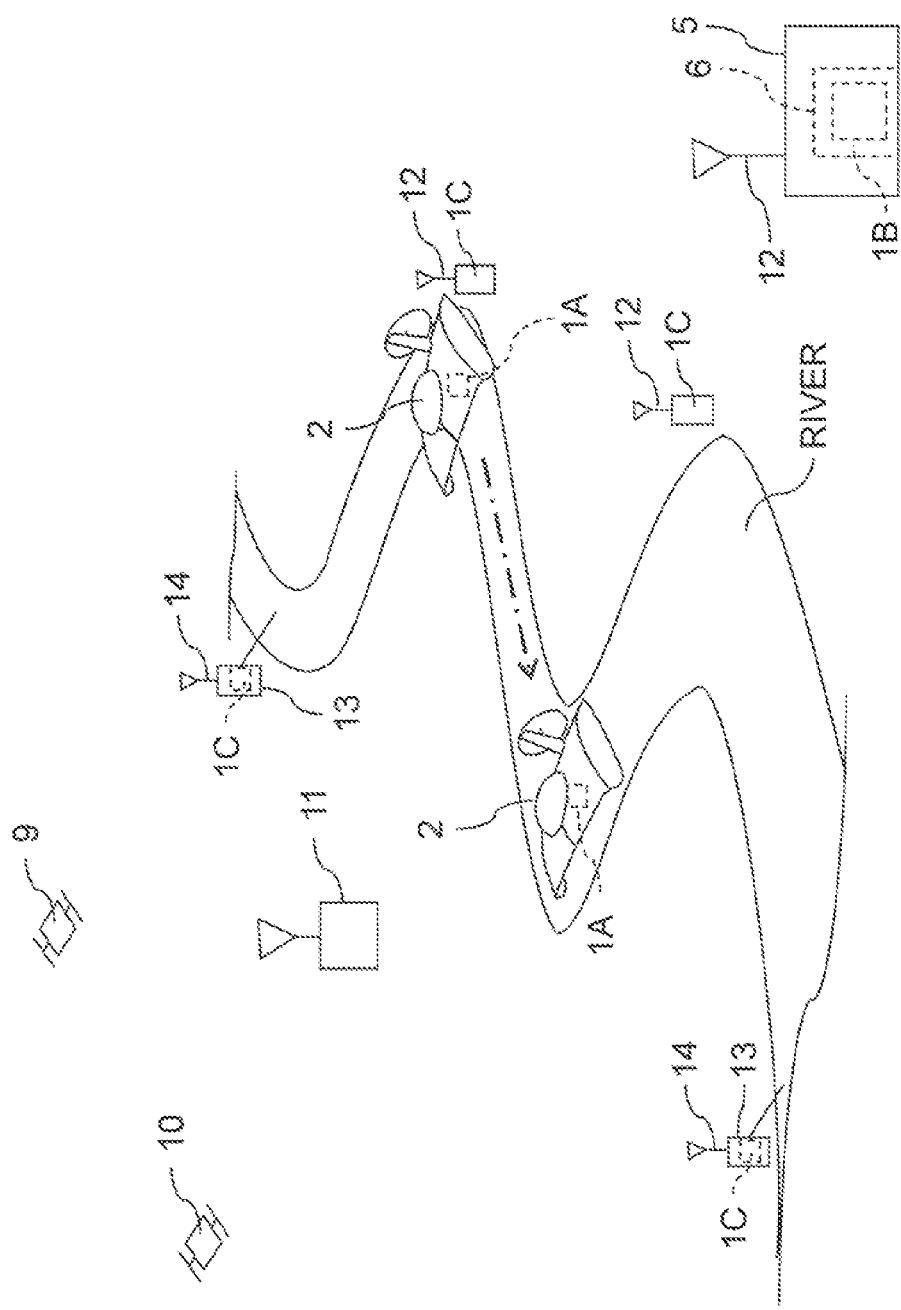
FIG. 1 shows an overall configuration including a flight support system of an aircraft according to the first implementation of the present invention, and FIG. 2.
Figure 2:
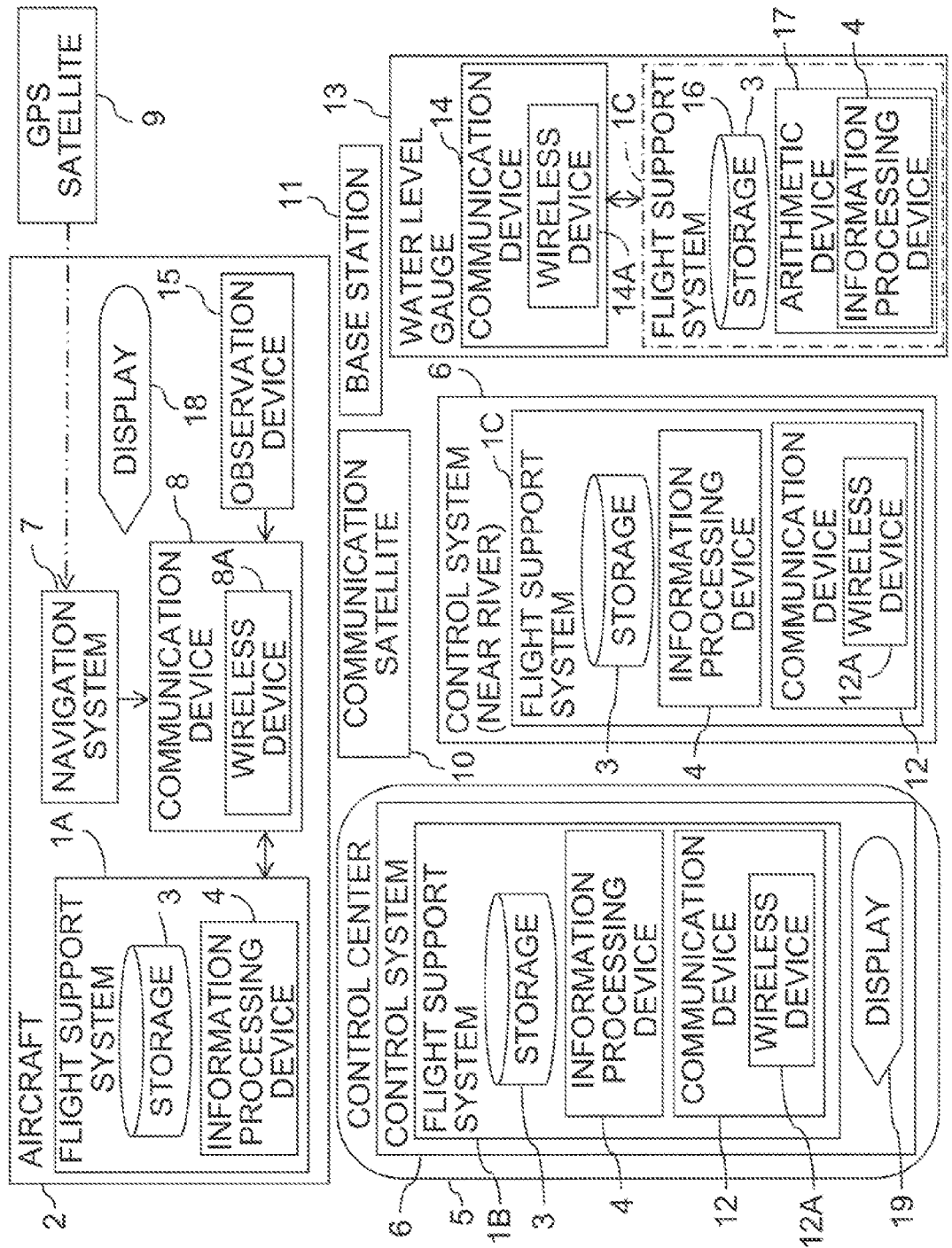
FIG. 2 is a functional block diagram of the flight support system shown in FIG. 1.

FIG. 1 shows an overall configuration including a flight support system of an aircraft according to the first implementation of the present invention, and FIG. 2 is a functional block diagram of the flight support system shown in FIG. 1.

A flight support system 1A, a flight support system 1B and a flight support system 1C are systems which support a flight of at least one aircraft 2 so that a flight path of the aircraft 2 may be over a river with high safety, as far as possible. A river means a place where water flows, and may be a large or small river. Moreover, lakes and marshes are kinds of rivers since lakes and marshes fall under places where water flows. Although there is no clear definition, comparatively large one out of lakes and marshes is called a lake while comparatively small one is called a pond in many cases.

No buildings are generally erected above these rivers, and the water surface of a river is flat as long as the river is not in a mountain area. Moreover, a possibility that people exist on a river is remarkably low compared with the ground. Therefore, even when a thing falls from the aircraft 2 or the height of the aircraft 2 decreases, human damage can be kept to the minimum. Furthermore, when the aircraft 2 can land on the water, the aircraft 2 becomes possible to take off and land on the water surface of a river having little undulation compared with the ground.

Accordingly, spaces above rivers can be determined as options for a flight path of the aircraft 2, and a space above a river can be set to a flight path of the aircraft 2 when desired conditions are satisfied. As a concrete example, when at least one aircraft 2 is used in order to periodically transport passengers or freight, at least one river above which a space may be an option for a periodic flight path of the aircraft 2 can be predetermined. Then, a space above a river can be determined to a periodic flight path of the aircraft 2 when desired conditions are satisfied.

Each of the flight support system 1A, the flight support system 1B and the flight support system 1C can be composed of storage 3 and an information processing device 4. The storage 3 stores position information on at least one river above which a space is an option for a flight path of at least one aircraft 2. The information processing device 4 automatically determines at least whether the flight path of at least one aircraft 2 should be over a specific river in order to fly the aircraft 2 to a destination, based on the position information on a river or rivers stored in the storage 3.

Therefore, each of the flight support system 1A, the flight support system 1B and the flight support system 1C can be composed of electronic circuitry, such as a computer, which has read a flight support program of at least one aircraft 2. The flight support program of the aircraft 2 or the aircrafts 2 makes a computer function as the storage 3 and the information processing device 4 of the flight support system 1A, the flight support system 1B or the flight support system 1C. The flight support program of the aircraft 2 or the aircrafts 2 may be distributed as a program product by recording the program on a information recording medium, or through a network, such as the internet.

Each storage 3 of the flight support system 1A, the flight support system 1B and the flight support system 1C function as a river database storing position information on one river or a plurality of rivers above which each space is an option for a flight path of the aircraft 2 or the aircrafts 2. Setting a flight path of the aircraft 2 to a sky above a specific river, along a traveling direction of the river, leads to effective use of the space above the river. Meanwhile, a flight path which crosses a sky above a river may be set.

As a practical example, a flight path of the aircraft 2 may be set to a flight path which crosses space above a river in order to avoid a structural object above the river, such as a bridge. When setting a flight path of the aircraft 2 to space over a river in a direction different from a traveling direction of the river is enabled, a two dimensional map including positions not only in a length direction of each river but also in a thickness direction of each river may be stored in the storage 3 as position information on rivers.

Hereinafter, an example of a case where a flight path of the aircraft 2 over a river can be made settable along a traveling direction of the river will be described mainly. In that case, what is necessary is to store at least position information in a length direction of each river above which a space has been determined as an option for a flight path of the aircraft 2 or the aircrafts 2, in the storage 3.

Even when a flight path of the aircraft 2 is set along a traveling direction of a river, a two dimensional map including positions in a thickness direction of each river may be stored in the storage 3 as the position information on each river. In this case, a more detailed flight path of the aircraft 2 can be set in consideration of the width of each river. For example, it becomes possible to set a flight path of the aircraft 2 to a space near the center of a river as far as possible, or to set a flight path of the aircraft 2 according to a traveling direction of the river so that the aircraft 2 can pass by another aircraft 2 which is flying over the same river in a counter direction.

The flight support system 1A, 1B or 1C can be placed in at least one of the aircraft 2, a control center 5, which controls the aircrafts 2 from the outside, and the vicinity of a river. In an example shown in FIG. 1, the flight support system 1A, the flight support system 1B and the flight support system 1C have been placed in all of the aircraft 2, the control center 5, and the vicinity of a river.

The flight support system 1A mounted on the aircraft 2 can be functioned as a part of operation support system of the aircraft 2. Meanwhile, the flight support system 1B placed in the control center 5 can be built in a control system 6 of the aircraft 2 as a part of the control system 6. Moreover, the flight support system 1C placed near a river can be functioned as a terminal, serving as a part of the flight support system 1B provided as a part of the control system 6 of the aircraft 2 in the control center 5, or an independent auxiliary control system 6 for the aircrafts 2.

Each aircraft 2 of which flight is supported by the flight support system 1A, the flight support by 1B and the flight support system 1C may be a manned aircraft, on which people board, and an OPV (optionally piloted vehicle) as well as an UAV (unmanned aerial vehicle) on which people do not board. An OPV is an unmanned aircraft which a pilot can also board and control, i.e., a hybrid aircraft of a manned aircraft and an unmanned aircraft. An UAV is also called a drone. Typical examples of an UAV include an unmanned rotorcraft, such as a multicopter and a helicopter. As a matter of course, a flight of a manned or unmanned fixed wing aircraft may be supported by the flight support system 1A, the flight support system 1B and the flight support system 1C.

The typical aircraft 2 includes a navigation system 7 and a communication device 8 including a wireless device 8A. The navigation system 7 obtains a spatial position of the aircraft 2 on which the navigation system 7 is mounted. Meanwhile, the communication device 8 performs wirelessly unidirectional communication or bidirectional communication with the flight support system 1B placed as the control system 6 in the control center 5, the flight support system 1C placed near a river or another aircraft 2.

As a kind of the navigation system 7, an inertial navigation system, a GPS (Global Positioning System) navigation system, and Doppler radar navigation system are known. An inertial navigation system detects a spatial position and velocity of the aircraft 2 using inertial measurement sensors, such as a gyroscope detecting change in attitude and an accelerometer detecting change in velocity. A GPS navigation system detects a spatial position of the aircraft 2 by receiving radio waves from the GPS satellites 9 by a GPS receiver as exemplified in FIG. 1. A Doppler radar navigation system is the navigation system 7 utilizing a phenomenon that the frequency of a reflected beam of radio wave beam discharged towards the surface of the earth changes due to the Doppler effect. Moreover, navigation sensors, such as a radio altimeter, may be used together as the navigation system 7.

A spatial position of the aircraft 2 obtained by the navigation system 7 can be transmitted, together with time, to the flight support system 1B placed as the control system 6 in the control center 5, the flight support system 1C placed near a river, other aircrafts 2 and the like, as a wireless signal by the communication device 8. Accordingly, time series spatial positions at respective times of each aircraft 2 can be collected by the flight support system 1B, placed in the control center 5 as the control system 6, and the flight support system 1C, placed in the vicinity of a river as the control system 6.

Communication using the communication device 8 of the aircraft 2 may be performed through a communication satellite 10 and a base station 11 for relay. When wireless communication is performed through the communication satellite 10 and the base station 11 for relay, bidirectional communication can be performed between the aircraft 2 and the control center 5 even when the aircraft 2 is far from the control center 5 to the extent that it is difficult to directly propagate an electric wave signal with the sufficient intensity.

When the frequency used for LTE (Long Term Evolution) which is the communication standard for portable telephones is assigned to communication between each aircraft 2 and the control center 5, existing base stations for portable telephones can be utilized as they are, as the base stations 11 for communication between each aircraft 2 and the control center 5.

When the flight support system 1A is mounted in the aircraft 2, the storage 3, which functions as a river database, and the information processing device 4, which automatically determines at least whether the flight path of the aircraft 2 should be over a specific river in order to fly the aircraft 2 to a destination, based on the position information on rivers stored in the storage 3, are mounted in the aircraft 2.

Accordingly, the information processing device 4 of the flight support system 1A mounted in the aircraft 2 can automatically determine whether a flight path of the aircraft 2 in which the flight support system 1A has been mounted should be over a specific river, during a flight of the aircraft 2 in which the flight support system 1A has been mounted. That is, an undetermined flight path of the flying aircraft 2 can be newly set or a set flight path of the flying aircraft 2 can be altered by the flight support system 1A.

Meanwhile, when the flight support system 1B and the flight support system 1C are prepared as the control systems 6 in the control center 5 and the vicinity of a river respectively, the storage 3, which functions as a river database, and the information processing device 4 are prepared in each of the control center 5 and the vicinity of a river. Thus, the control systems 6 including the flight support system 1B and the flight support system 1C control one aircraft 2 or the plurality of aircrafts 2 from the outside.

Specifically, the information processing device 4 of the flight support system 1B or the flight support system 1C provided as the control system 6 can automatically determines whether a flight path of at least one flying aircraft 2 should be over a specific river, based on the position information on at least one river stored in the storage 3, by setting a space above at least one river as an option of a flight path. Thereby, the information processing device 4 can generate information for determining a flight path of at least one flying aircraft 2. The information generated by the information processing device 4 can be transmitted to the targeted aircraft 2 as a wireless signal from the wireless device 12A of the communication device 12 placed as an element of the flight support system 1B or the flight support system 1C.

The flight support system 1B or the flight support system 1C prepared as the control system 6 or a part of the control system 6 can also set a flight path of the aircraft 2 before a flight or flight paths of the aircrafts 2 before flights as well as a flight path of the flying aircraft 2 or flight paths of the flying aircrafts 2. That is, each of the flight support system 1B and the flight support system 1C prepared as the control systems 6 can automatically set a flight path of at least one aircraft 2 before the flight of the aircraft 2. In that case, the information processing device 4 can automatically set a flight path of the aircraft 2 to a space above a specific river, based on the position information on at least one river stored in the storage 3, before flying the aircraft 2, so that a mission, such as transportation, observation, or pesticide spraying, using the aircraft 2 or the aircrafts 2 can be attained.

Whether a flight path of the aircraft 2 should be over a specific river can be determined based on desired conditions, which have been previously designated, as exemplified by a viewpoint whether the safety of the aircraft 2 is securable or a viewpoint whether a mission of the aircraft 2 can be efficiently carried out. When a flight path over a river can be selected based on a predetermined selecting conditions, in order to fly the aircraft 2 to a destination, based on the position information on at least one river stored in the storage 3, determining the flight path over the river as a flight path of the aircraft 2 leads to an effective use of a space above the river.

As a practical example, when a value of each parameter representing the safety of the aircraft 2 is within an allowable range, a space above a river can be determined as a flight path of the aircraft 2. When spaces above rivers can be selected as a flight path of the aircraft 2, a space above a river where combination of values of parameters representing the safety of the aircraft 2 and values of parameters representing efficiency on carrying out a mission using the aircraft 2 becomes optimum can be determined as a flight path of the aircraft 2. That is, a space above a river can be determined as a flight path of the aircraft 2 so that the flight path becomes more efficient while the safety of the aircraft 2 is secured.

Specific examples of parameters showing the safety of the aircraft 2 include weather parameters, showing the existence and degree of a thunder, a hail and a dense fog, and geoscience parameters showing the existence of an eructation and the like. In addition, a water level and wind conditions of and above each river, above which a space is an option of a flight path of the aircraft 2, are typical parameters showing the safety of the aircraft 2. The wind conditions above each river can be shown by parameters consisting of a wind velocity and a wind direction. For that reason, when at least one of a water level of a river, a wind velocity above the river and a wind direction above the river becomes outside an allowable range, it is appropriate not to set the space above the corresponding river as a flight path of the aircraft 2.

A water level of a river can be measured at positions along the river by water level gauges 13 placed at the positions. In recent years, a wireless water level gauge which measures a water level of a river and transmits a measured water level of the river, as a wireless signal showing a measuring result of the water level, together with information for specifying a measuring point of the water level, by a communication device 14 having a wireless device 14A, is available. Meanwhile, the wind velocity and the wind direction above a river can be measured not only by placing an observation device for the weather near the river, but also by observation devices 15 included in the aircraft 2 which flies over the river.

Each typical aircraft 2 has the observation devices 15 including sensors, such as angle of attack sensors, pressure sensors and temperature sensors, in order to measure air data including an air speed and the like. Therefore, the wind speed and the wind direction above a river can be observed by the observation devices 15 included in the aircraft 2.

Accordingly, when the aircraft 2 is flying over a specific river set as a flight path, at least one of the wind direction and the wind speed above the river measured by sensors of the observation devices 15 included in the aircraft 2 can be related with a position of the aircraft 2 and be transmitted to the control system 6 in the control center 5 or another control system 6 placed near a river, as a wireless signal by the wireless device 8A included in the aircraft 2.

Thus, information including water levels of rivers and wind conditions above rivers can be transmitted to the control systems 6, as observational data, from the water level gauges 13 each placed in the vicinity of a river and the observation devices 15 of the aircrafts 2. Alternatively, the observational data may be transmitted to the flight support system 1A of the aircraft 2 from the water level gauges 13 each placed in the vicinity of a river, the observation devices 15 mounted on other aircrafts 2 and the like without passing through the control system 6. In that case, water levels of rivers and wind conditions above rivers can be notified to the flight support system 1A of the aircraft 2 in real time.

In particular, the typical digital water level gauge 13 has not only the communication device 14 but also electric circuitry including storage 16 and an arithmetic device 17. Accordingly, a function as the flight support system 1C can be added to the water level gauge 13 by installing the flight support program of the aircraft 2 in a computer included in the water level gauge 13. That is, the arithmetic device 17 of the water level gauge 13 can be made to function as the information processing device 4 of the flight support system 1C while the storage 16 of the water level gauge 13 can be made to function as the storage 3 of the flight support system 1C.

In that case, when the water level gauge 13 is placed on at least one river above which a space is an option for a periodic flight path of the aircraft 2 or the aircrafts 2, the communication device 14, the storage 16 and the arithmetic device 17 included in the water level gauge 13 can be utilized so that not only unidirectional communication but also bidirectional communication can be performed between the water level gauge 13 and each of the flight support system 1B provided as a part of the control system 6 in the control center 5 and the flight support system 1A mounted on each aircraft 2.

In particular, when the existing water level gauge 13 is replaced with the water level gauge 13, to which the functions as the control system 6 and the flight support system 1C have been added, at update timing, the installation cost of the control system 6 and the flight support system 1C can be reduced. In other words, the infrastructure for the aircrafts 2 of which flight paths are over a river or rivers can be organized merely by placing the new flight support system 1C, which functions as the control system 6, only at each position where the water level gauge 13 has not been placed yet.

Examples of unidirectional communication between the water level gauge 13 and each of the flight support system 1B placed in the control center 5 and the flight support system 1A mounted on each aircraft 2 include communication which wirelessly transmits a measured value of a water level of a river from the water level gauge 13 to the flight support system 1B in the control center 5 or the flight support system 1A of the aircraft 2 as mentioned above. Such unidirectional communication can also be performed by the existing water level gauge 13 having a simple water level measurement function.

In addition, information for specifying a measurement position of a water level can also be wirelessly transmitted from the water level gauge 13 to the flight support system 1A of the aircraft 2. The information for specifying a measurement position of a water level may be a coordinate itself showing the position of the water level gauge 13 or the measurement position of the water level, or may be identification information on the water level gauge 13 so that the measurement position of the water level can be specified with reference to a table showing a relation between the identification information on the water level gauge 13 and the position of the water level gauge 13 or the measurement position of the water level.

When the information for specifying a measurement position of a water level is transmitted from the water level gauge 13 to the flight support system 1A of the aircraft 2, the flight support system 1A of the aircraft 2 which receives the information for specifying the measurement position of the water level becomes possible to automatically specify a spatial position of the aircraft 2 based on the position of the water level gauge 13 or the measurement position of the water level in addition to using the navigation system 7.

Accordingly, when the aircraft 2 is flying over a specific river set as a flight path and the wireless device 8A included in the aircraft 2 has received information for specifying a measurement position of a water level transmitted from the water level gauge 13 which measures the water level of the specific river, a flight position of the aircraft 2 may be automatically corrected, based on the received information for specifying the measurement position of the water level, by the information processing device 4 of the flight support system 1A mounted on the aircraft 2.

Alternatively, when the aircraft 2 is a manned aircraft, a position of the water level gauge 13 or a measurement position of a water level may be displayed on a display 18 placed in the aircraft 2. Thereby, boarding persons on the aircraft 2 can easily recognize the present position of the aircraft 2.

Thus, the water level gauges 13 can be used as electric wave signs for checking or correcting a flight position of each aircraft 2.

Meanwhile, when bidirectional communication can be performed among the flight support system 1A of each aircraft 2, the flight support system 1B in the control center 5 and the flight support system 1C built in each water level gauge 13, desired information can be stored in the storage 3 built in each water level gauge 13, or conversely, information stored in the storage 3 built in each water level gauge 13 can be extracted and transmitted.

As a practical example, position information of the flying aircraft 2 at a predetermined time, transmitted as a wireless signal from the communication device 8 included in the aircraft 2, can be obtained by the information processing device 4 built in the water level gauge 13 through the wireless device 14A of the water level gauge 13 and the obtained position information on the aircraft 2 can be stored in the storage 3 of the water level gauge 13.

Then, pieces of identification information and passage times of the respective aircrafts 2 which passed through over each river whose water level is a measurement target can be recorded on the storage 3 of the water level gauge 13. Passage times of the respective aircrafts 2 stored in the storage 3 of each water level gauge 13 can be used for various purposes, such as grasping flight states including whether each aircraft 2 is flying as planned, grasping an achievement state of a mission by the aircrafts 2 and securing an appropriate interval between the aircrafts 2. As a concrete example, when a mission by the aircraft 2 or the aircrafts 2 is to transport goods, such as cargos, passage times of the aircrafts 2 can be used for grasping current positions of transported goods.

Therefore, the information processing device 4 of each water level gauge 13 can be given a function to transmit position information on the aircrafts 2 stored in the storage 3, as wireless signals through the wireless device 14A of the water level gauge 13, so that the position information on the aircrafts 2 can be received by the wireless devices 8A prepared in other aircrafts 2 and other control systems 6.

As another concrete example, observation data, such as a wind speed and a wind direction, observed by the observation devices 15 of each aircraft 2, and weather information observed by the nearest weather observation device can also be transmitted to the water level gauge 13 to be stored in the storage 3 of the water level gauge 13. In that case, the observational data, such as a wind speed and a wind direction, and the weather information can be transmitted so as to be received by the wireless devices 8A included in the aircrafts 2 and other control systems 6.

When the flight support system 1B and the flight support system 1C, which compose the control systems 6 placed in the control center 5 and in the vicinity of a river, have collected a water level of each river, a wind speed above each river and a wind direction above each river, the collected information can be transmitted, by wireless communication, from the flight support system 1B and the flight support system 1C of the control systems 6 to the flight support system 1A of each autonomously flying aircraft 2, as values of parameters showing the safety of the aircrafts 2.

Alternatively, when the aircraft 2 flies under remote control by the control system 6 or a flight path of the aircraft 2 is set before the flight, the flight support system 1B or 1C of the control system 6 can automatically set up the flight path of the aircraft 2 based on values of parameters showing the safety of the aircraft 2 so that a river above which the safety is low can be avoided.

Specifically, the information processing device 4 of the flight support system 1B or 1C composing the control system 6 can automatically determine whether at least one of a water level of each river, above which a space is an option for a flight path of the aircraft 2, and wind conditions above each river, above which a space is an option of a flight path of the aircraft 2, is within an allowable range or not by threshold processing. Then, when it has been determined that at least one of the water level and the wind conditions is out of the allowable range, a flight path of the aircraft 2 can be automatically set so as to avoid a space above each river where at least one of the water level and the wind conditions has been determined to be out of the allowance range.

When the aircraft 2 is flown by remote control from the control system 6, flight control for automatically flying the aircraft 2 by transmitting a flight program, for flying the aircraft 2 along a flight path, to the aircraft 2 or flight control for automatically flying the aircraft 2 by transmitting control information, for remotely piloting the aircraft 2 in order to fly the aircraft 2 along a flight path, to the aircraft 2 can be adopted.

Therefore, the information processing device 4 of the flight support system 1B or 1C composing the control system 6 can automatically set a flight path of the aircraft 2 or control information on the aircraft 2 for automatically and remotely piloting the aircraft 2 so that the aircraft 2 may fly over a specific river when it has been determined that the flight path of the aircraft 2 should be over the specific river. Then, the flight path of the aircraft 2 or the control information on the aircraft 2 set in the information processing device 4 can be transmitted, as wireless signals, from the wireless device 12A of the flight support system 1B or 1C composing the control system 6 to the aircraft 2.

When no river over which can be used as a flight path can be selected from the all rivers, which run between a takeoff point and a landing point of the aircraft 2, based on a predetermined selection conditions of a river, as in a case where a value of at least one of parameters, such as a water level and wind conditions, showing the safety is out of an allowable range for every river, the information processing device 4 of the flight support system 1B or 1C automatically determines that a flight path of the aircraft 2 should not be over a specific river. In such a case, the information processing device 4 can automatically set a flight path of the aircraft 2 to one which is not over any river, such as a flight path over the land or over the sea.

That is, the information processing device 4 of the flight support system 1B or 1C composing the control system 6 can automatically set a flight path over a river to a flight path of the aircraft 2 when any flight path over a river can be selected, based on selecting conditions predetermined from a viewpoint of ensuring the safety and the like, in order to fly the aircraft 2 to a destination. Meanwhile, when no flight path over any river can be selected based on the selecting conditions, a flight path which is not over any river can be automatically set as a flight path of the aircraft 2.

When a flight path of the aircraft 2 is set before the aircraft 2 takes off or when the aircraft 2 has not entered an airspace, in which a space above a river is an option for the flight path, even after the aircraft 2 took off, a mission, such as freighting, can be substituted by land traffic, such as a automobile or a railroad, or a flight plan can be updated so that the aircraft 2 lands to be temporarily on standby and subsequently a flight of the aircraft 2 is resumed.

Accordingly, the information processing device 4 of the flight support system 1B composing the control system 6 placed in the control center 5 may be given a function to indicate information for suggesting achievement of a mission by land traffic or information for suggesting temporally keeping the aircraft 2 waiting, on a display 19 of the control system 6 placed in the control center 5 when any flight path over a river cannot be selected, as a flight path of the aircraft 2, based on the predetermined selection conditions. Thereby, when a water level of a river is high, for example, air transportation by the aircraft 2 can be altered to transportation by a truck, or the time of air transportation by the aircraft 2 can be postponed.

On the other hand, when the aircraft 2 autonomously flies without remote control from the control system 6, information for determining whether a flight path should be over a river, in order to set the flight path can be transmitted from the control system 6 to the flight support system 1A of the aircraft 2. Specifically, values of parameters showing safety, such as a water level of each river, and a wind speed and a wind direction above each river, can be acquired and stored in the storage 3 of the flight support system 1B or 1C which composes the control system 6, as mentioned above. Then, the stored values of parameters can be wirelessly transmitted to the flight support system 1A of the aircraft 2 together with information for specifying each river.

In this case, the information, such as a water level of at least one river, transmitted from the flight support system 1B or 1C composing the control system 6 is received as wireless signals by the wireless device 8A prepared in the aircraft 2. Thereby, the information processing device 4 of the flight support system 1A mounted on the aircraft 2 can automatically determine whether a flight path of the aircraft 2 should be over a specific river, based on the information, such as a water level of at least one river, corresponding to the wireless signals received by the wireless device 8A, and the position information on at least one river stored in the storage 3 which functions as a river database.

More specifically, when the information processing device 4 of the flight support system 1A mounted on the aircraft 2 has obtained at least one of a water level of a river and wind conditions above the river, as the information corresponding to the wireless signals from the control system 6, the information processing device 4 can automatically determine whether at least one of the water level and the wind conditions is within an allowable range, by threshold processing. When it has been determined that at least one of the water level and the wind conditions is out of the allowable range, a flight path of the aircraft 2 can be automatically set to avoid over the river where at least one of the water level and the wind conditions has been determined to be out of the allowable range. Meanwhile, when it has been determined that both of the water level and the wind conditions are within the allowable ranges, a flight path of the aircraft 2 can be automatically set to be over the river where both of the water level and the wind conditions have been determined to be within the allowable ranges.

Thus, the information processing device 4 of the flight support system 1A mounted on the aircraft 2 can automatically determine whether a flight path over a river stored in the storage 3 can be selected as a flight path of the aircraft 2, by setting whether at least one of a water level of the river and wind conditions above the river is out of an allowable range, to a selecting condition.

When the information processing device 4 of the flight support system 1A mounted on the aircraft 2 has determined that the flight path of the aircraft 2 should be over a specific river, the information processing device 4 can automatically pilot the aircraft 2 so that the aircraft 2 may fly over the specific river as the flight path. Thereby, it becomes possible to autonomously fly the aircraft 2 with setting a flight path of the aircraft 2 to be over a river where the safety has been confirmed.

As described above, when a flight path above a river or flight paths above rivers can be selected, based on selecting conditions predetermined from a viewpoint of securing the safety and the like, in order to fly the aircraft 2 to a destination, setting a flight path of the aircraft 2 to a flight path above a certain river automatically by the information processing device 4 mounted on the aircraft 2 leads to an effective use of the river or the rivers. Meanwhile, when no flight paths over rivers can be selected based on predetermined selecting conditions, the information processing device 4 mounted on the aircraft 2 can automatically set a flight path of the aircraft 2 to a flight path which is not above any river, such as a space above land or sea.

When the width of a river is narrow and it is dangerous for the two aircrafts 2, flying over the same narrow river in directions opposite to each other, to pass by each other even in consideration of the altitude direction, it is suitable to make any one of the aircrafts 2 secede from the space above the river. Also in a case where the two aircrafts 2 are flying over the same river in the same direction and decreasing the flight speed of the subsequent aircraft 2 in order to keep an interval between the two aircrafts 2 may cause a stall of the subsequent aircraft 2, it is suitable to make any one of the aircrafts 2 secede from the space above the river.

Accordingly, positions and flight plans of other aircrafts 2 which are flying or will fly over at least one river above which a space is an option for a flight path may also be used as parameters representing the safety of the aircrafts 2, in addition to a water level of each river and wind conditions above each river, or instead of a water level of each river and wind conditions above each river. As mentioned above, positions of other aircrafts 2 can be collected in the control center 5 to be sent to each aircraft 2, and can be also acquired with communication between the aircrafts 2.

A flight path of each aircraft 2 can be set based on not only values of parameters showing the safety, but values of parameters showing the efficiency, as mentioned above. Concrete examples of a parameter showing the efficiency include duration of flight, a cruising distance, and fuel consumption of the aircraft 2 for flying the aircraft 2 to a destination.

Even when the cruising distance of the aircraft 2 is the same, fuel consumption and a flight speed change depending on a wind direction and an altitude. In particular, setting a flight path so that wind becomes downwind can reduce fuel consumption. Meanwhile, a flight speed of the aircraft 2 is sometimes restricted in order to keep an interval from another aircraft 2 flying ahead. Therefore, duration of flight, a cruising distance, and fuel consumption of each aircraft 2 may be individually evaluated using parameters consisting of a wind direction, flight positions of other aircrafts 2 and the like.

When there are flight paths over rivers where values of parameters showing the safety are within allowable ranges, as options, it is necessary to select one flight path over a river as a flight path of the aircraft 2. For that reason, a flight path over one river can be selected from options of flight paths over rivers by estimating not only values of parameters showing the safety but also the above-mentioned values of parameters showing the efficiency.

As a concrete example, when flight paths over rivers can be selected, based on predetermined selecting conditions, in order to fly the aircraft 2 to a destination, the information processing device 4 of the flight support system 1A, 1B or 1C prepared in the aircraft 2, the control center 5 or the vicinity of a river can automatically set up a flight path of the aircraft 2 to one of the flight path over the river with the highest safety, the flight path over the river over which the aircraft 2 can arrive at the destination in the shortest time, the flight path over the river over which the aircraft 2 can arrive at the destination with the shortest cruising distance, and the flight path over the river over which the aircraft 2 can arrive at the destination with the smallest fuel consumption.

When a flight path of the aircraft 2 is automatically set to be over the river with the highest safety, what is necessary is to set the flight path of the aircraft 2 to the flight path over the river where a value of a desired parameter or combination of values of desired parameters, such as water levels of rivers, wind speeds and wind directions above rivers, and positions and flight plans of other aircrafts 2, representing the safety as mentioned above becomes optimum.

Meanwhile, when a flight path of the aircraft 2 is automatically set to one of the flight path over the river over which the aircraft 2 can arrive at a destination in the shortest time, the flight path over the river over which the aircraft 2 can arrive at the destination with the shortest cruising distance, and the flight path over the river over which the aircraft 2 can arrive at the destination with the smallest fuel consumption, what is necessary is to set the flight path of the aircraft 2 to the flight path over the river where a value of a desired parameter or combination of values of desired parameters, such as duration of flight, a cruising distance, and fuel consumption of the aircraft 2, representing the efficiency becomes optimum.

Moreover, it is also important to set a flight path of each aircraft 2 so that a mission using the aircraft 2 or the aircrafts 2 may be achieved. As a concrete example, in a case where the aircraft 2 has a mission, such as transportation of people and things, pesticide spraying, photographing from the sky, or observation of physical quantities, of which completion time has been designated, it is suitable to automatically set up a flight path of the aircraft 2 in the information processing device 4 of the flight support system 1A, 1B or 1C so that the mission can be completed by the designated time.

An automatic setup of a flight path, for achieving a mission using at least one aircraft 2, by the information processing device 4 can be also performed during a flight of at least one aircraft 2 as well as before a flight of each aircraft 2. As a concrete example, when the information processing device 4 of the flight support system 1A mounted on the aircraft 2 has determined that flight paths over rivers can be selected based on the position information on at least one river stored in the storage 3, a flight path of the aircraft 2 can be automatically set to be over a specific river so that a mission using the aircraft 2 may be achieved by a designated completion time.

When a flight path of at least one aircraft 2 is set before a flight of each aircraft 2 so that a mission using at least one aircraft 2 may be achieved, the information processing device 4 can automatically set not only a flight path of each specific aircraft 2 but also flight conditions for the aircrafts 2, such as the number of the aircrafts 2 and the number of flights of each aircraft 2, by desired algorithms, such as an optimization calculation, based on conditions for achieving the mission.

As a concrete example, when the information processing device 4 of the flight support system 1B placed in the control center 5 automatically sets flight paths of the aircrafts 2 of which a mission is transportation of freight, a flight path of each aircraft 2 can be automatically set by an optimization calculation, of which a constraint condition is to transport a designated volume of the freight to a destination, for optimizing at least one of the number, fuel, flight distance, a flight number and an index value expressing safety, of the aircrafts 2 which transport the freight. As a matter of course, the optimization calculation may be performed under a constraint condition that parameters expressing safety, such as water levels of rivers, become within allowable ranges respectively.

Thereby, safe and efficient physical distribution service using the aircrafts 2 which fly over at least one river as a flight path can be provided. Specifically, each flight path can be set by optimum distribution of cargos to the aircrafts 2 for preventing an amount of cargos loaded on each aircraft 2 from lessening, and it becomes possible to transport targeted freight with the smaller number of the aircrafts 2 and the smaller number of flights of the aircrafts 2.

When the aircraft 2 has taken off and a mission, such as transportation of cargos, is actually started, an achievement state of the mission can be recorded on the flight support systems 1C built in the water level gauges 13 as the control systems 6 and the flight support systems 1C placed around rivers as the dedicated control systems 6 as mentioned above. As a concrete example, when transportation of cargos is a mission by the aircrafts 2, an achievement state of the whole mission can be easily grasped in the control center 5 and the like, by recording a cargo volume, loaded on each aircraft 2, on the storage 3 of the flight support system 1C.

Moreover, when at least one aircraft 2 has a mission for transporting cargos, the aircraft 2 or the aircrafts 2 which can land on water may be used and a flight path of at least one aircraft 2 can also be determined so that at least one of loading and unloading of cargos may be performed above a river. In that case, it becomes possible to effectively utilize spaces on a river or rivers also as spaces for loading and unloading cargos. As a matter of course, not only in a case of loading and unloading cargos but in a case where it has become necessary to promptly land the aircraft 2 having a landing function on water, such as a case where failure has arisen in the flying aircraft 2, it is possible to automatically set a position on a river to a position for landing the aircraft 2 on water, by the information processing device 4 of the flight support system 1A, 1B or 1C.

(Effects)

As described above, the flight support systems 1A, 1B and 1C for at least one aircraft 2, the method of supporting a flight of at least one aircraft 2, the flight support program of at least one aircraft 2, and the aircrafts 2 can determine a space above a river as a flight path of the aircraft 2 frequently as much as possible from a viewpoint of the safety.

Therefore, according to the flight support systems 1A, 1B and 1C for at least one aircraft 2, the method of supporting a flight of at least one aircraft 2, the flight support program of at least one aircraft 2, and the aircrafts 2, a space above a river without unevenness can be effectively utilized as a flight path of the aircraft 2. In particular, when indexes, such as water levels of rivers and wind conditions above rivers, expressing the safety are estimated, flight paths of the aircrafts 2 with higher safety can be determined. In addition, when indexes expressing the efficiency are also estimated, efficient flight paths of the aircrafts 2 can be determined.

Therefore, while the shortage of long distance truck drivers has been actualized in the physical distribution field, for example, substitution to transportation by the aircrafts 2 including unmanned aircrafts becomes realistic. That is, safety can be secured even when transportation is performed by the aircrafts 2 since the frequency at which the aircraft 2 fly over a land where houses and the like stand can be decreased.

Moreover, a function as the control system 6 for each aircraft 2 which flies over a river can be given to the water level gauge 13 placed on the river. Specifically, an electric wave sign function and a function as a server providing data for the aircrafts 2 can be given to the water level gauge 13. Thereby, it becomes possible to constitute a control system for the aircrafts 2 which flies over a river simply with a low cost.

OTHER IMPLEMENTATIONS

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A flight support system of at least one aircraft comprising:
storage that stores position information on at least one river above which a space is an option for a flight path of the at least one aircraft; and information processing circuitry configured to:
automatically determine at least whether the flight path of the at least one aircraft should be over a specific river included in the at least one river in order to fly the at least one aircraft to a destination, based on the position information stored in the storage;
obtain information corresponding to at least a water level of the specific river;
determine whether the water level of the specific river is within an allowable range; and
automatically set the flight path to avoid flying over the specific river based on determining that the water level of the specific river is out of the allowable range.

2. The flight support system according to claim 1, wherein the flight support system is mounted on the at least one aircraft, and
the information processing circuitry is adapted to automatically determine at least whether the flight path of the at least one aircraft should be over the specific river, during a flight of the at least one aircraft, based on the position information stored in the storage and information transmitted from a control system controlling the at least one aircraft from an outside, the information transmitted from the control system corresponding to a wireless signal received by a radio in the at least one aircraft.

3. The flight support system according to claim 2, wherein the information processing circuitry is adapted to automatically control the at least one aircraft to fly the at least one aircraft over the specific river as the flight path of the at least one aircraft when it has been determined that the flight path of the at least one aircraft should be over the specific river.

4. The flight support system according to claim 2, wherein the information processing circuitry is adapted to automatically set the flight path of the at least one aircraft to a first flight path over the specific river when at least one flight path over the at least one river can be selected, based on a predetermined selection condition, in order to fly the at least one aircraft to the destination, the first flight path being included in the at least one flight path, and
the information processing circuitry is adapted to automatically set the flight path of the at least one aircraft to a second flight path which is not over the at least one river when no flight path over the at least one river can be selected based on the predetermined selection condition.

5. The flight support system according to claim 4, wherein the information processing circuitry is adapted to automatically determine whether the first flight path over the specific river can be selected, and
the predetermined selection condition is whether at least one of a water level of the specific river and a wind condition above the specific river is out of an allowable range.

6. The flight support system according to claim 2, wherein the information processing circuitry is adapted to automatically set the flight path of the at least one aircraft to one flight path out of flight paths over rivers when the flight paths over the rivers can be selected, based on a predetermined selection condition, in order to fly the at least one aircraft to the destination, the one flight path being a flight path over a river with a highest safety, a flight path over a river over which the at least one aircraft can arrive at the destination in a shortest time, a flight path over a river over which the at least one aircraft can arrive at the destination with a shortest flying range, or a flight path over a river over which the at least one aircraft can arrive at the destination with a smallest fuel consumption.

7. The flight support system according to claim 2, further comprising:
observation circuitry that transmits at least one of a wind direction and a wind speed above the specific river when the at least one aircraft is flying over the specific river set as the flight path, the at least one of the wind direction and the wind speed being measured by at least one sensor attached to the at least one aircraft, the at least one of the wind direction and the wind speed being transmitted by the radio or another radio in the at least one aircraft, the at least one of the wind direction and the wind speed being transmitted as another wireless signal to the control system or another control system, the at least one of the wind direction and the wind speed being related to a position of the at least one aircraft.

8. The flight support system according to of claim 2, wherein the information processing circuitry is adapted to automatically correct a flight position of the at least one aircraft, based on information for specifying a measuring point of a water level of the specific river when the at least one aircraft is flying over the specific river set as the flight path and the information for specifying the measuring point of the water level has been received by the radio or another radio in the at least one aircraft, the information for specifying the measuring point of the water level being transmitted from a water level gauge which measures the water level and transmits a measuring result of the water level, as another wireless signal, together with the information for specifying the measuring point of the water level.

9. The flight support system according to claim 1, wherein the flight support system controls the at least one aircraft from an outside of the at least one aircraft, and
the information processing circuitry is adapted to generate information, for determining the flight path of the at least one aircraft which is flying, by automatically determining whether the flight path of the at least one flying aircraft should be over the specific river, based on the position information on the at least one river stored in the storage, by setting the space above the at least one river as the option of the flight path,
further comprising:
a radio that transmits the information, generated by the information processing circuitry, as a wireless signal, toward the at least one aircraft.

10. The flight support system according to claim 9, wherein the information processing circuitry is adapted to automatically set, as the information, the flight path of the at least one aircraft for flying the at least one aircraft over the specific river or control information on the at least one aircraft for automatically and remotely piloting the at least one aircraft so as to fly the at least one aircraft over the specific river when it has been determined that the flight path of the at least one aircraft should be over the specific river, and
the radio is adapted to transmit the flight path of the at least one aircraft or the control information on the at least one aircraft, set by the information processing circuitry, as the wireless signal, toward the at least one aircraft.

11. The flight support system according to claim 9,
wherein the information processing circuitry is adapted to determine whether at least one of a water level of the at least one river and a wind condition above the at least one river is within an allowable range, and automatically set the flight path of the at least one aircraft to avoid over a river where at least one of a water level and a wind condition has been determined to be out of the allowable range.

12. The flight support system according to claim 9,
wherein the information processing circuitry is adapted to automatically set the flight path of the at least one aircraft to a first flight path over the specific river when at least one flight path over the at least one river can be selected, based on a predetermined selection condition, in order to fly the at least one aircraft to the destination, the first flight path being included in the at least one flight path, and
the information processing circuitry is adapted to automatically set the flight path of the at least one aircraft to a second flight path which is not over the at least one river when no flight path over the at least one river can be selected based on the predetermined selection condition.

13. The flight support system according to claim 9,
wherein the information processing circuitry is adapted to automatically set the flight path of the at least one aircraft over the specific river, during a flight of the at least one aircraft, based on the position information on the at least one river stored in the storage, the flight path being set on a condition that a mission using the at least one aircraft is achieved.

14. The flight support system according to claim 1,
wherein the flight support system is adapted to automatically set the flight path of the at least one aircraft before a flight of the at least one aircraft, and
the information processing circuitry is adapted to automatically set the flight path of the at least one aircraft over the specific river, before the flight of the at least one aircraft, based on the position information on the at least one river stored in the storage, the flight path being set on a condition that a mission using the at least one aircraft is achieved.

15. The flight support system according to claim 14,
wherein the information processing circuitry is adapted to indicate information for suggesting achievement of the mission by land traffic or information for suggesting temporally stacking the at least one aircraft, on a display when no flight path over the at least one river can be selected as the flight path of the at least one aircraft, based on a predetermined selection condition.

16. The flight support system according to claim 15,
wherein the information processing circuitry is adapted to automatically set the flight path of the at least one aircraft by an optimization calculation for optimizing at least one of a number, fuel, flight distance, a flight number, and an index value expressing safety, of the at least one aircraft which carries out freight as the mission, a constraint condition of the optimization calculation being transporting a designated freight load to a transport destination.

17. The flight support system according to claim 16,
wherein another constraint condition of the optimization calculation is that a parameter representing at least one of a water level of the at least one river and a wind condition above the at least one river is within an allowable range.

18. A flight support system of at least one aircraft, the system being built in a water level gauge which measures a water level of a river and transmits the measured water level and a measuring point of the water level with a first radio, the system comprising:
information processing circuitry of the water level gauge that acquires position information on the at least one aircraft at a predetermined time, through the first radio of the water level gauge, the position information being transmitted, as a first wireless signal, from a second radio in the at least one aircraft; and
storage of the water level gauge that stores the acquired position information,
wherein the information processing circuitry is adapted to transmit the position information stored in the storage, as a second wireless signal, through the first radio of the water level gauge so as to allow receiving with a third radio with which another aircraft or a control system for controlling the at least one aircraft from an outside of the at least one aircraft is equipped.

19. A method of supporting a flight of at least one aircraft comprising: determining at least one river above which a space may be an option for a periodic flight path of the at least one aircraft, and storing position information, on the determined at least one river, in storage;
determining a flight path of the at least one aircraft to a flight path over a river included in the at least one river, based on the position information on the at least one river stored in the storage when the flight path over the river can be selected, based on a predetermined selection condition, in order to fly the at least one aircraft to a destination;
obtain information corresponding to at least a water level of the river;
determine whether the water level of the river is within an allowable range; and
automatically set the flight path to avoid flying over the river based on determining that the water level of the river is out of the allowable range.

20. The method of supporting the flight of the aircraft according to claim 19,
wherein a water level gauge which measures the water level of the at least one river and transmits a measuring result of the water level, as a wireless signal, by a radio is placed on the at least one river, and bidirectionally or unidirectionally communicates with the at least one aircraft, flying over the at least one river, through a use of the radio, storage and an arithmetic device, each included in the water level gauge.

21. The method of supporting the flight of the aircraft according to claim 19,
wherein an aircraft capable of landing on a water is used as the at least one aircraft of which a mission is transporting a cargo, and
the flight path of the at least one aircraft is determined so as to carry out at least one of loading and unloading the cargo on the at least one river.

22. A medium storing a flight support program of at least one aircraft, the program causing a computer to function as:
storage that stores position information on at least one river above which a space is an option for a flight path of the at least one aircraft; and
information processing circuitry that is configured to:
automatically determine at least whether the flight path of the at least one aircraft should be over a specific river included in the at least one river in order to fly the at least one aircraft to a destination, based on the position information stored in the storage;
obtain information corresponding to at least a water level of the specific river;
determine whether the water level of the specific river is within an allowable range; and
automatically set the flight path to avoid flying over the specific river based on determining that the water level of the specific river is out of the allowable range.

23. An aircraft including:
the flight support system according to claim 2.

* * * * *